United States Patent
Tong et al.

(10) Patent No.: US 7,463,600 B2
(45) Date of Patent: *Dec. 9, 2008

(54) FRAME STRUCTURE FOR VARIABLE RATE WIRELESS CHANNELS TRANSMITTING HIGH SPEED DATA

(75) Inventors: Wen Tong, Ottawa (CA); Leo L. Strawczynski, Ottawa (CA); Shalini S. Periyalwar, Ottawa (CA); Claude Royer, Hull (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1688 days.

This patent is subject to a terminal disclaimer.

(21) Appl. No.: 09/766,267

(22) Filed: Jan. 19, 2001

(65) Prior Publication Data

US 2003/0123414 A1 Jul. 3, 2003

Related U.S. Application Data

(60) Provisional application No. 60/177,093, filed on Jan. 20, 2000.

(51) Int. Cl.
*H04L 12/28* (2006.01)
*H04Q 7/00* (2006.01)
*H04J 3/26* (2006.01)
*H04J 3/16* (2006.01)

(52) U.S. Cl. ........................ 370/314; 370/468; 370/432; 370/395.4

(58) Field of Classification Search ................ 370/204, 370/208, 209, 210, 314, 310, 333, 473, 470, 370/471, 474, 475, 498, 337, 338, 329, 432, 370/468, 395.21, 390, 391, 389, 326, 320, 370/328, 330, 335, 431, 437, 341, 342, 395.2, 370/395.43, 395.4, 394; 375/262, 261, 259, 375/225

See application file for complete search history.

(56) References Cited

U.S. PATENT DOCUMENTS

| | | | | |
|---|---|---|---|---|
| 4,855,995 A | * | 8/1989 | Hiyama et al. | 370/460 |
| 6,058,107 A | * | 5/2000 | Love et al. | 370/332 |
| 6,167,282 A | * | 12/2000 | Hunsberger | 455/513 |
| 6,307,867 B1 | * | 10/2001 | Roobol et al. | 370/470 |
| 6,332,006 B1 | * | 12/2001 | Rydbeck et al. | 375/262 |
| 6,456,598 B1 | * | 9/2002 | Le Strat et al. | 370/252 |
| 6,463,096 B1 | * | 10/2002 | Raleigh et al. | 375/225 |
| 6,496,794 B1 | * | 12/2002 | Kleider et al. | 704/201 |
| 6,498,936 B1 | * | 12/2002 | Raith | 455/466 |
| 6,597,894 B1 | * | 7/2003 | Ue et al. | 455/69 |
| 6,628,633 B1 | * | 9/2003 | Mochizuki | 370/335 |
| 6,665,361 B1 | * | 12/2003 | Christodoulides et al. | 375/364 |

(Continued)

*Primary Examiner*—Hanh Nguyen
(74) *Attorney, Agent, or Firm*—Garlick Harrison & Markison; Bruce E. Garlick

(57) ABSTRACT

A frame structure that is optimized for providing variable high data rates. Superframes, each comprised of a predetermined number of frames, carry data communications at one or more variable data rates. Each data customer is allotted one or more frames or portions of frames within the superframe, called sub-frames, as is needed to deliver the data communication. The allocation for the data customers is not fixed, but varies as the data rate varies over time, and also to meet the needs of the data customers. Each high speed data frame includes a self-indication of the contents of the high speed data frame. This self-indication identifies one or more data users serviced by the high speed data frame and the data rate of the data contained in the high speed data frame. Each high speed data frame may service multiple user terminals, with the high speed data frame subdivided into two or more subframes. In this case, an additional self-indication may be provided to identify an intended user terminal and a corresponding data rate for the second user terminal. The frame structure may be applied to service ATM cells.

23 Claims, 14 Drawing Sheets

U.S. PATENT DOCUMENTS

| | | | |
|---|---|---|---|
| 6,816,507 B1 * | 11/2004 | Jarbot et al. | 370/465 |
| 6,816,546 B1 * | 11/2004 | Raleigh et al. | 375/225 |
| 6,917,603 B2 * | 7/2005 | Strawczynski et al. | 370/336 |
| 6,956,834 B2 * | 10/2005 | Stanwood et al. | 370/329 |
| 6,956,835 B2 * | 10/2005 | Tong et al. | 370/330 |
| 6,996,083 B1 * | 2/2006 | Balachandran et al. | 370/337 |
| 2001/0033560 A1 * | 10/2001 | Tong et al. | |
| 2001/0053141 A1 * | 12/2001 | Periyalwar et al. | 370/337 |

* cited by examiner

FRAME STRUCTURE FOR VARIABLE RATE WIRELESS CHANNELS TRANSMITTING HIGH SPEED DATA

CROSS-REFERENCE TO RELATED APPLICATION

The present application claims priority pursuant to 35 U.S.C. Sec 119(e) to U.S. Provisional Application Ser. No. 60/177,093, filed Jan. 20, 2000, which is hereby incorporated by reference in its entirety.

BACKGROUND

1. Technical Field

The present invention relates generally to cellular wireless communication networks; and more particularly to the transmission of voice communications and data communications in such a cellular wireless communication network.

2. Related Art

Wireless networks are well known. Cellular wireless networks support wireless communication services in many populated areas of the world. Satellite wireless networks are known to support wireless communication services across most surface areas of the Earth. While wireless networks were initially constructed to service voice communications, they are now called upon to support data communications as well.

The demand for data communication services has exploded with the acceptance and widespread use of the Internet. While data communications have historically been serviced via wired connections, wireless users are now demanding that their wireless units also support data communications. Many wireless subscribers now expect to be able to "surf" the Internet, access their email, and perform other data communication activities using their cellular phones, wireless personal data assistants, wirelessly linked notebook computers, and/or other wireless devices. The demand for wireless network data communications will only increase with time. Thus, wireless networks are currently being created/modified to service these burgeoning data communication demands.

Significant performance issues exist when using a wireless network to service data communications. Wireless networks were initially designed to service the well-defined requirements of voice communications. Generally speaking, voice communications require a sustained bandwidth with minimum signal-to-noise ratio (SNR) and continuity requirements. Data communications, on the other hand, have very different performance requirements. Data communications are typically bursty, discontinuous, and may require a relatively high bandwidth during their active portions. To understand the difficulties in servicing data communications within a wireless network, consider the structure and operation of a cellular wireless network.

Cellular wireless networks include a "network infrastructure" that wirelessly communicates with user terminals within a respective service coverage area. The network infrastructure typically includes a plurality of base stations dispersed throughout the service coverage area, each of which supports wireless communications within a respective cell (or set of sectors). The base stations couple to base station controllers (BSCs), with each BSC serving a plurality of base stations. Each BSC couples to a mobile switching center (MSC). Each BSC also typically directly or indirectly couples to the Internet.

In operation, a user terminal communicates with one (or more) of the base stations. A BSC coupled to the serving base station routes voice communications between the MSC and the serving base station. The MSC routes the voice communication to another MSC or to the public switched telephone network (PSTN). BSCs route data communications between a servicing base station and a packet data network that may couple to the Internet.

The wireless link between the base station and the user terminal is defined by one of a plurality of operating standards, e.g., AMPS, TDMA, CDMA, GSM, etc. These operating standards, as well as new 3G and 4G operating standards define the manner in which the wireless link may be allocated, setup, serviced and torn down. These operating standards must set forth operations that will be satisfactory in servicing both voice and data communications.

The wireless network infrastructure must support both low bit rate voice communications and the varying rate data communications. More particularly, the network infrastructure must transmit low bit rate, delay sensitive voice communications together with high data rate, delay tolerant rate data communications. While voice communications typically have a long hold time, e.g., remain active for longer than two minutes on the average, high data rate/delay tolerant data communications are bursty and are active only sporadically. As contrasted to the channel allocation requirements of voice communications, channels must be frequently allocated and deallocated to the data communication in order to avoid wasting spectrum. Such allocation and deallocation of channels to the data communications consumes significant overhead.

Further, because voice communications must have priority over data communications, the data communications often can be allocated little or no resources. Not only must data users compete with voice users for channels, they must compete with the other data users for the channels as well. In most operating scenarios, it is very difficult to obtain a channel and to maintain the channel to fully service the data communication. If the channel allocation is prematurely deallocated by the network infrastructure, the data communication will be interrupted causing a protocol layer above the physical layer of the wireless link to fail.

It would therefore be desirable to provide a communication system that is capable of carrying both delay sensitive lower data rate voice communications and delay tolerant higher data rate data communications with minimal waste of spectral capacity. Further, it would also be desirable to provide a communication system that also services bursty data traffic for a plurality of data users without wasting allocated spectrum.

SUMMARY OF THE INVENTION

A communication system constructed according to the present invention employs a Time Division Multiplexed (TDM) superframe/frame structure that is optimized for servicing both delay tolerant, high data rate data transmissions and delay intolerant, low bit rate voice transmissions. The TDM frame structure of the present invention supports flexible framing of transmissions that include both the lower data rate, delay intolerant voice communications as well as the delay tolerant higher data rate data communications using sub-framing operations. Thus, the system and method of the present invention provides significant benefits for both data communication only wireless traffic and for a combination of voice communication and data communication wireless traffic.

The TDM frame structure of the present invention employs data rate matching so that different data rates may be supported for different user terminals sharing the TDM frame structure. When used on the forward link, a base station selects data rates for each of a plurality of serviced user terminals based upon the channel qualities reported by the user terminals. Then, the base station/network infrastructure constructs the superframe to service required voice and data communications such that sufficient service levels are met.

According to one aspect of the present invention, forward link transmissions are formed into a plurality of superframes, each superframe including a predetermined number of frames. Each of the frames carries voice communications at one or more data rates. The size of a superframe is limited by the delay tolerance for voice transmissions, typically 20 ms. Each voice customer is allotted one or more frames or portions of frames (subframes) within the superframe as is needed to deliver the lower data rate, low latency voice communication. Any frames/subframes in a superframe that are not needed to carry voice communication are assigned to carry higher speed data having compatible data rate requirements. Further, each of the frames may carry both voice and data communications.

Advantageously, the present invention supports high data rate customers concurrently with supporting voice customers over the same forward link. The invention also efficiently manages bandwidth to accommodate multiple voice customers together with other data users on the same high data rate frame.

Further, the time sharing aspects of the present invention provide significant advantages for the servicing of data users. By servicing a plurality of data users upon a single time division multiplexed forward link, all of the allocated spectrum may be employed to service the data users and maximize throughput results. Thus, no allocated spectrum is wasted. Further, the superframe structure is capable of servicing user terminals supporting different data rates. Moreover, because each superframe is constructed separately, each superframe may service different user terminals at different data rates and at different service levels.

The frame structure of the superframe of the present invention includes explicit data rate indicator(s)/user indicator(s) that explicitly indicate for which user terminal(s), and at what data rate(s) the frame's data exists. Thus, a user terminal may determine which frames are for it intended, and at what data rates the frames are transmitted. The explicit data rate indicator(s)/user indicator(s) require minimal encoding so that the user terminals easily interpret them. With these explicit indicators included in the frames, user terminals ignore the data intended for other user terminals and avoid the high processing requirements of decoding for such data.

In one embodiment of this explicit data rate indicator/user terminal indicator, a header in each frame of the superframe indicates a data rate for the frame and the user terminal(s) for which data in the frame is intended. The header may also include a pilot signal that the user terminals use to determine the forward link channel quality. Further, the header may include power control bits intended for a plurality of user terminals serviced by the corresponding base station. In another embodiment, the frame includes a primary header that indicates user terminals and data rates for the first half of the frame and a secondary header that indicates user terminals and data rates for the second half of the frame.

According to the present invention, each superframe/frame services a plurality of user terminals. Thus, operation according to the present invention determines how each superframe will be constructed and transmitted. Generally speaking, each user terminal serviced within a respective cell/sector reports to the servicing base station the quality of a plurality of forward link traffic channels it monitors and/or an indication of a data rate that it may support on each of the monitored forward link traffic channels. The base station, base station controller, or other network infrastructure component, receives this information and then determines a maximum data rate for each of the serviced user terminals.

The base station next determines which user terminals require voice communication service in the next superframe. Based upon this information, and the maximum supported data rates for the user terminals requiring voice communication service, the base station allocates at least one frame/subframe for voice communications if voice communications are serviced by the superframe, and determines at least one data rate for the voice communications. According to one operation, user terminals supporting a same data rate may share frames/subframes.

Once the base station has allocated all voice communications, it next determines which user terminals will receive data communication service, and at what level of service, in the next superframe. Based upon this determination, and the maximum data rate serviced by each of the user terminals, the base station allocates frames/subframes to the user terminals for data communications. As with the voice communication service allocation, user terminals being allocated data communications at the same data rate may share frames/subframes. Thus, operation for the data only allocation is similar to the voice/data allocation except that with the voice/data allocation, the voice user terminals have priority over the data only user terminals.

Other features and advantages of the present invention will become apparent from the following detailed description of the invention made with reference to the accompanying drawings.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE DRAWINGS

Figure 1:
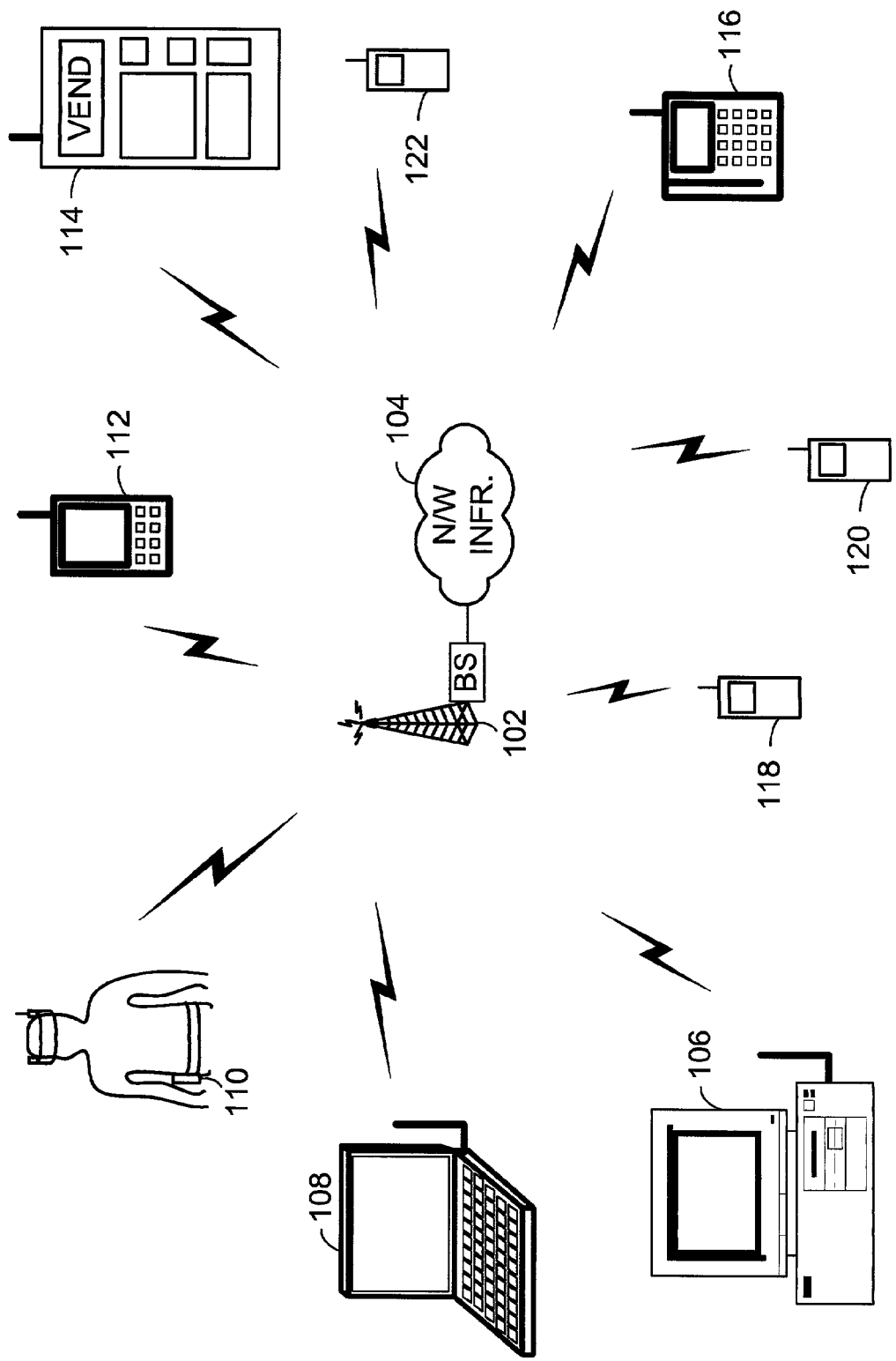
FIG. 1 is a system diagram illustrating a portion of a cellular wireless network constructed according to the present invention.

FIG. 1 is a system diagram illustrating a portion of a cellular system 100 in which a plurality of user terminals 106-122 share a Time Division Multiplexed (TDM) forward link according to the present invention. The cellular system 100 infrastructure shown includes a base station 102 and a network infrastructure 104. These components are generally known and will be described only as they relate to the teachings of the present invention. The cellular system 100 operates according to a CDMA standard that has been modified according to the present invention, e.g., IS-95B, IS-2000, 3GPP, W-CDMA, or another CDMA standard that has been modified according to the operations described herein. In particular, the high speed data (HSD) 1xEV standard data only (DO), the HSD 1xEV standard data and voice (DV), and the 3GPP HSD standard may operate according to some aspects of the present invention.

The base station 102 provides wireless service within a corresponding geographic area (e.g., cell or sector(s)). The base station establishes a forward link and at least one reverse link with the user terminals 106-122. Once these links are established, the base station 102 transmits voice communications and data communications to the user terminals 106-122. Likewise, the user terminals 106-122 transmit voice communications and data communications to the base station 102 on the reverse link(s).

Some of the user terminals (e.g., voice terminals 118, 120 and 122) service only voice communications. Alternatively, other of the user terminals (e.g., data terminal 112, vending machine 114 and credit card terminal 116) service only data communications. Further, at least some of these users terminals (e.g., desktop computer 106, laptop computer 108, and wearable computer 110) service both voice communications and data communications.

In servicing the voice and data communications, the base station 102 supports a single forward link channel (F-CH) that services all of the user terminals 106-122. The base station 102 and the user terminals 106-122 interact to setup a plurality of reverse link channels (R-CH), one of which services each of the user terminals 106-122.

To accomplish sharing of the F-CH, the F-CH uses a TDM superframe structure that includes a plurality of frames, each of which includes a plurality of sub-frames. This superframe/frame structure flexibly accommodates both voice communications and data communications, without adversely impacting the low bit rate requirements of the voice communications. Further, this superframe/frame structure efficiently supports data communications without wasting any valuable allocated bandwidth and by fairly allocating the available allocated bandwidth among the serviced user terminals.

In this superframe structure, each superframe includes an integer number of frames and each of the frames includes an integer number of subframes. Each of the frames/subframes may carry voice communications, data communications, or a combination of voice communications and data communications. The data rate is variable on a frame-by-frame basis with the data rate chosen for the frame/subframe determined based upon the user terminal(s) being serviced in such frame/subframe and respective channel quality indications for the user terminal(s), as reported by the user terminal(s). Thus, each superframe typically services a plurality of user terminals at a plurality of differing data rates. Further, each superframe is typically filled with voice and/or data so that all available spectrum is used.

In a described embodiment of the present invention, the F-CH is a spread-spectrum code division multiplexed channel. The F-CH services only a single user terminal at any given time. To increase channel throughput, the forward link transmission being serviced at any given time is modulated with a set of 16 Walsh codes prior to its transmission. Thus, the F-CH uses no code sharing to distinguish user terminals.

However, portions of the frames/subframes of the superframe may contain data that was separately modulated with different Walsh codes so that the particular portion of the superframe/frame/subframe is separately received by each serviced user terminal. An example of such data is power control data, e.g., power control bits, that are transmitted on the F-CH but are employed to control the transmit power of reverse link transmissions. A plurality of power control bits that are intended for a plurality of different user terminals are separately modulated with a plurality of corresponding Walsh codes and transmitted on the F-CH within the superframe/frame/subframe the same time. The user terminals then decode this segment of the superframe/frame/subframe to receive their individual power control bits.

Because the data throughput requirements placed on the reverse link are substantially less than those placed on the forward link, the reverse links are serviced using conventional reverse link CDMA techniques. According to the present invention, the user terminals determine F-CH channel quality, e.g., pilot signal strength/interference ratio, or maximum supportable data rate, and report this channel quality to at least one serving base station on reverse links. Based upon the F-CH channel quality reported by each user terminal, as well as additional factors, the base station allocates frames/subframes of the superframe to the user terminals.

The size of each superframe is limited by the delay tolerance for the low latency service (voice communications). Based on the delay tolerance (e.g., 20 ms), an integer number of frames are included to form a superframe of that same duration. In each superframe, each voice customer is allocated only the frames or portions of frames needed to deliver the voice communication. Data communications are assigned to the remaining frames and portions of frames that are not used to carry the voice communication. Preferably, the voice calls are clustered at the beginning of the superframe. The assignment of voice and data communications to the superframe is described below by way of example with reference to FIGS. 6A and 6B.

Figure 2:
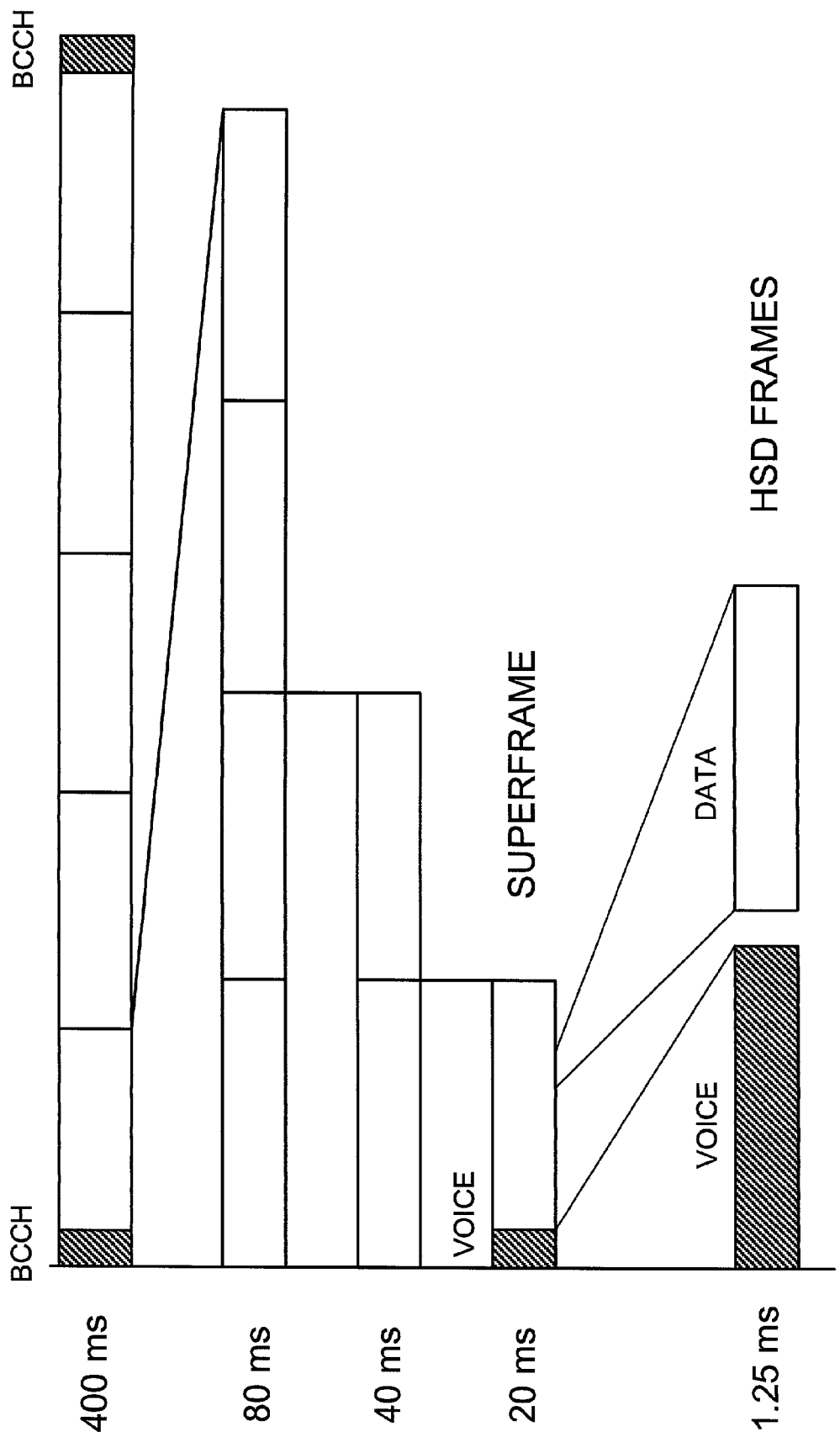
FIG. 2 is a block diagram illustrating the structure of superframes and high speed data frames according to the present invention.

FIG. 2 is a block diagram illustrating the structure of superframes and high speed data (HSD) frames according to the present invention. The superframe structure is transmitted on the F-CH and fits within the other requirements placed upon the F-CH. In particular, every 400 ms, the base station 102 transmits a broadcast channel (BCCH) field within the F-CH. Thus, an integer multiple of the superframes fits within the timing requirement of the BCCH. As described herein, each superframe is 20 ms in length and includes 16 HSD frames, each having a duration of 1.25 ms. With this structure, the BCCH field is transmitted every 400 ms using 8 HSD frames at a data rate of 76.8 kbps. Further, every 20th 20 ms superframe will include the BCCH field.

As shown, each 20 ms superframe may include voice communications and/or data communications. The superframe structure is shared among a plurality of users serviced on the F-CH by the base station 102. Thus, the 20 ms superframe services all F-CH requirements for the transmitting base station 102 and supports all forward link voice communication requirements and data communication requirements of the base station 102.

Figure 3:
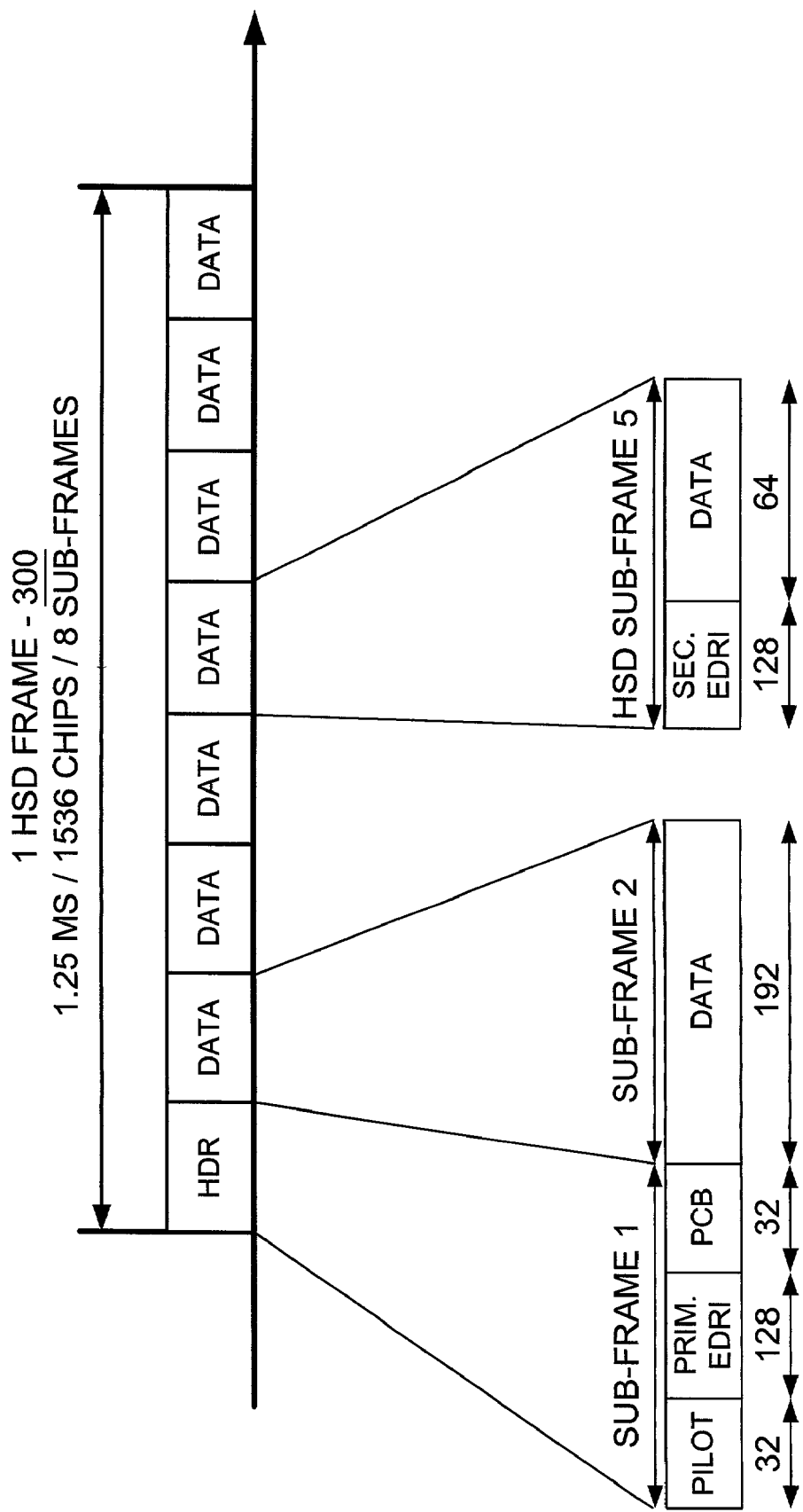
FIG. 3 is a block diagram illustrating the structure of a high speed data frame according to the present invention that carries only data.

FIG. 3 is a block diagram illustrating the structure of a high speed data frame 300 according to the present invention that carries data. The HSD frame 300 is transmitted on the F-CH and is 1.25 ms in duration. The HSD frame 300 includes 1536 chips, and 8 subframes, each of which includes 192 chips. However, the size, number of chips, number of subframes, and other particular structural qualities of the HSD frame 300 are an example only, and the HSD frame 300 could have other sizes and structures but still fall within the teachings of the present invention.

In this frame structure, a first HSD subframe serves as a header for the frame and includes a pilot signal (32 chips), an explicit data rate indicator (EDRI) field that identifies both intended user terminals and indicates at least one data rate for the HSD frame (128 chips), and a plurality of power control bits (32 chips). The HSD frame may also include a secondary EDRI that is included in the fifth subframe of the HSD frame 300.

The pilot signals are synchronized among all base stations and are used both for timing purposes and for channel quality estimation. User terminals receive the pilot signals and, based upon the strength of the pilot signals received, and the corresponding interference levels, determine a channel quality indication. Each user terminal then reports to a base station serving its reverse link at least one channel quality indication it determines. This channel quality indication report, e.g., Pilot Strength Measurement Message, is reported to its serving base station on either a R-CH or a reverse access/control channel.

One indication of channel quality is the carrier-to-interference (C/I) ratio for a respective pilot signal/channel. Thus, in one operation according to the present invention, the user terminal reports C/I ratios for each pilot signal it measures. Such reporting may be limited based upon thresholds applied by the user terminal. In an alternate operation, a user terminal would, instead of reporting the channel quality relating to each received pilot signal, determine a maximum supportable data rate for each corresponding channel and report the maximum supportable data rate(s) to its serving base station. The base station/network infrastructure then uses the reported channel qualities to determine from which base station(s) to transmit forward link voice communications and/or data communications to the user terminal and at what maximum data rate.

In the described embodiment, the pilot signal includes all zero bits and is encoded with a 32 chip Walsh code. A total of 32 Walsh codes exist for pilot signal Walsh coding, with the separate Walsh codes used to distinguish pilot signals from one another. The pilot signal is also covered by complex pseudo-noise (PN) spreading prior to its transmission. Such encoding results in a 15 dB processing gain.

The primary EDRI (and secondary EDRI, when included) provides an explicit indication of the data rate(s) for data contained in the HSD frame 300, the identities of the user terminal(s) for whom the data is intended, and the relative position of the data within the HSD frame 300. As will be further described with reference to FIGS. 7 and 8, when the HSD frame contains both voice and data communications, the EDRI may also provide additional information relating to the voice communication. In the data only embodiment of FIG. 3, the EDRI includes a plurality of bits to indicate a data rate for the HSD frame 300, one bit to indicate that the HSD frame 300 carries data, and a plurality of bits to identify one or more user terminals for which the data in the HSD frame 300 is intended.

When the secondary EDRI is included, the primary EDRI indicates the data rate and the user terminal for the first three data carrying subframes (2-4) of the HSD frame 300. The secondary EDRI then indicates the user terminal for which the last four data carrying subframes (5-8) of the HSD frame 300 are intended. Note that when the secondary EDRI is included, it only occupies a portion of the fifth subframe and the remaining portion of the fifth subframe is filled with data. Further, in this embodiment, each HSD frame 300 may service only two user terminals. However, in other embodiments, each HSD frame 300 may service more than two user terminals.

The header also includes power control bits (PCBs) that direct user terminals currently serviced by the F-CH to either increase or decrease their reverse link transmission power. In this embodiment, the PCBs are punctured on the I & Q branches of the F-CH separately. For each user, a respective power control bit is modulated by one of 16 Walsh codes. These Walsh encoded outputs are then further modulated by a two times PN spreading code. Thus, with this modulation type, a maximum of 16 users may be served on the I-branch and a maximum of 16 users may be served on the Q-branch so that the reverse link power control of a total of 32 users per frame may be controlled via the PCB bits.

The present invention is also applicable to asynchronous mode transmission (ATM) using TDM frames. In ATM communications, information is transferred in basic units known as cells. Each ATM cell is comprised of 53 bytes of which five bytes comprise a header field and the remaining 48 bytes comprise a user information field. One or more ATM cells are embedded in the TDM frames.

In accordance with the invention, ATM cells from one or more customers are embedded in the sub-frame structure of the invention in a manner similar to that described above so that the frames or superframes carry data at different transmission rates within the same superframe and the data rate transmission rates may change over time. The Virtual Path Identifier and Virtual Circuit Identifier fields of the 5 byte ATM header may be separately contained within the data field or may be integrated into the EDRI field of the frame header. To denote the end of a message for ATM Adaptation Layer 5 (AAL5), one additional bit may be punctured into the data. Other ATM fields may optionally be punctured into the data frames as well. While the ATM cell is shown to consume two subframes of the HSD frame, the number of subframes or cells that the ATM cell uses depends upon the data rate serviced by the frames/subframes.

As an example, when the frame duration is 1.25 ms and the data rate is 153.6 kbps, each frame of the superframe is divided into 8 sub-frames each comprised of 192 chips. In this example, an ATM cell information packet containing 48 bytes is distributed over two frames. Advantageously, the present invention provides data call customers with the ability to concurrently carry on a voice call without directing the voice call over a complementary or peer network. As a further advantage, the voice call is carried by the same high-speed access network as the data call without adversely affecting the efficiency and speed of the data traffic.

Figure 4A:
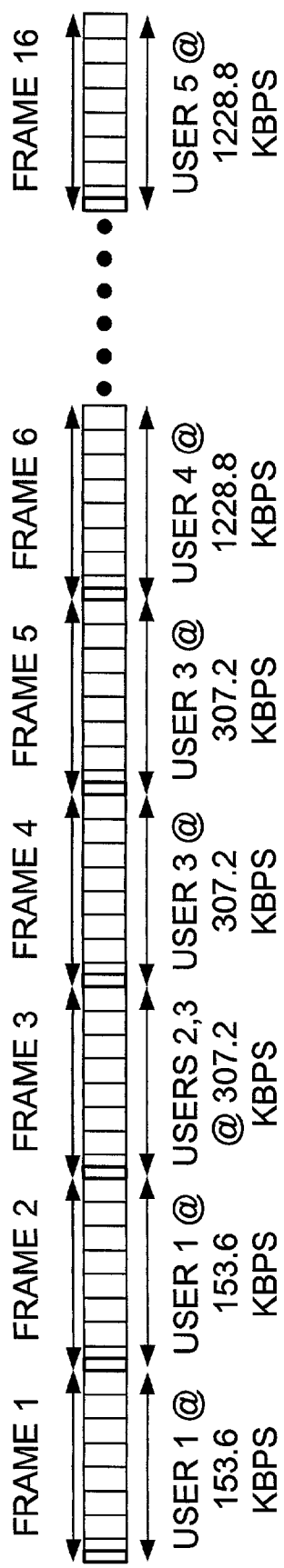
FIGS. 4A and 4B are block diagrams illustrating examples of superframes formed according to the present invention that carry only data communications.
Figure 4B:
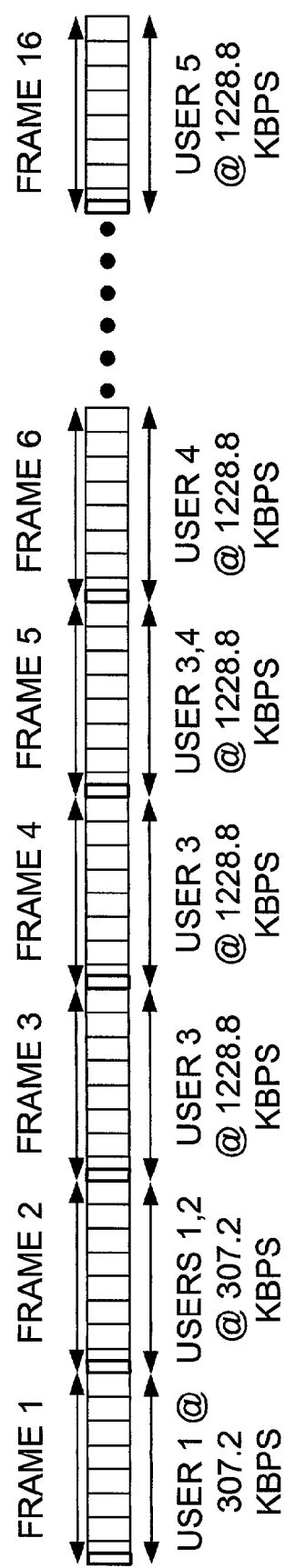

FIGS. 4A and 4B are block diagrams illustrating examples of superframes formed according to the present invention that carry only data. Referring now particularly to FIG. 4A, at a first time T1, there is one ongoing data transmission to user 1 at 153.6 kbps, two data transmissions, to users 2 and 3, at 307.2 kbps, and two data transmissions, to users 4 and 5, at 1228.8 kbps. As shown, the data transmissions to user 1 occupy frames 1 and 2, the data transmission to user 2 occupies one-half of frame 3, and the data transmission to user 3 occupies one-half of frame 3 and all of frames 4 and 5. Further, as is partially shown, the data transmissions to users 4 and 5 occupy all of frames 6 through 16.

Referring now to FIG. 4B, at a succeeding time T2, the channel and interference conditions (C/I) have changed, and therefore some of the data communications require new data rates. Further, based upon the throughput requirements for the F-CH, the allocations for each user terminal have also changed. Thus, the data transmissions for users 1 and 2 are now transmitted at 307.2 kbps and the data transmissions for users 3, 4, and 5 are now transmitted at 1228.8 kbps. With the new allocations and data rate assignments, user 1 data occupies all of frame 1 and one-half of frame 2. User 2 data occupies one-half of frame 2. Further, user 3 is allocated all of frames 3 and 4 and one-half of frame 5. Further, as is partially shown, users 4 and 5 are allocated one-half of frame 5 and all of frames 6 through 16.

Figure 5:
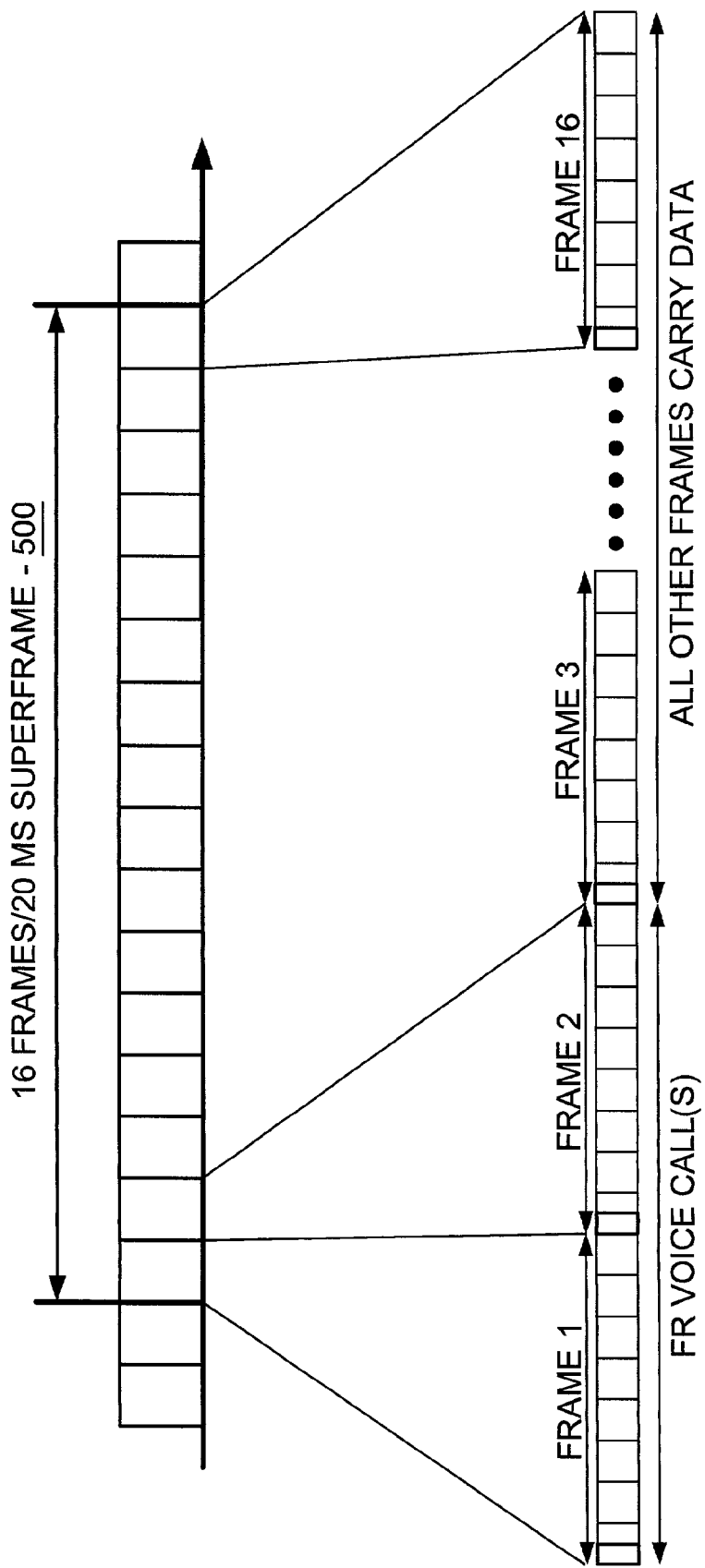
FIG. 5 is a block diagram illustrating the structure of a superframe according to the present invention that carries both voice and data communications.

FIG. 5 is a block diagram illustrating the structure of a superframe 500 according to the present invention in which voice communications and data communications share the superframe 500 transmitted on the F-CH. A 20 ms duration superframe 500 is assumed, with sixteen 1.25 msec frames comprising the superframe 500 in which a voice call is supported together with data communications. Two frames, frame 1 and frame 2, are needed to carry a voice call at the data rate of 76.8 kbps, and thus, frame 1 and frame 2 of the superframe 500 are allocated to the voice call. The remaining frames, frame 3 through frame 16 carry data. Thus, the superframe carries only one voice call.

The number of frames within the superframe 500 that are needed to support a voice call is determined by the data rate(s). At a data rate of 76.8 kbps, each frame may support one-half of a voice call. At 153.6 kbps, each frame supports 1 voice call; at 307.2 kbps, each frame may supports up to 2 voice calls; at 614.4 kbps, each frame may support up to 4 voice calls; at 921.6 kbps, each frame may support up to 6 voice calls; and at 1228.8 kbps, each frame may support up to 8 voice calls. However, the number of voice user terminals that can actually be supported on one F-CH is limited by the delay tolerance for voice and the demand for spectrum from the data users sharing the F-CH. As an example, the system may be restricted to support only five voice calls per superframe.

Figure 6A:
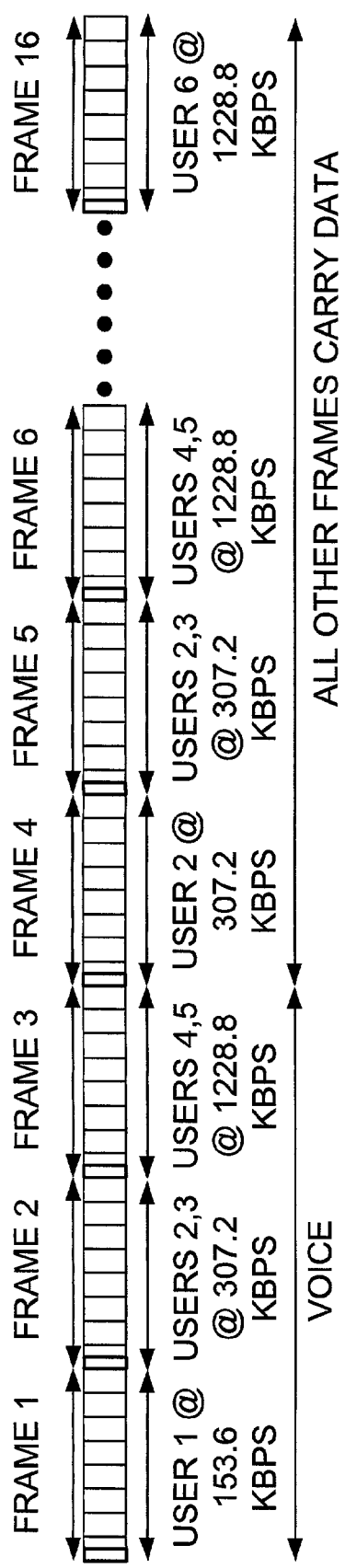
FIGS. 6A and 6B are block diagrams illustrating examples of superframes formed according to the present invention that carry both voice and data communications.
Figure 6B:
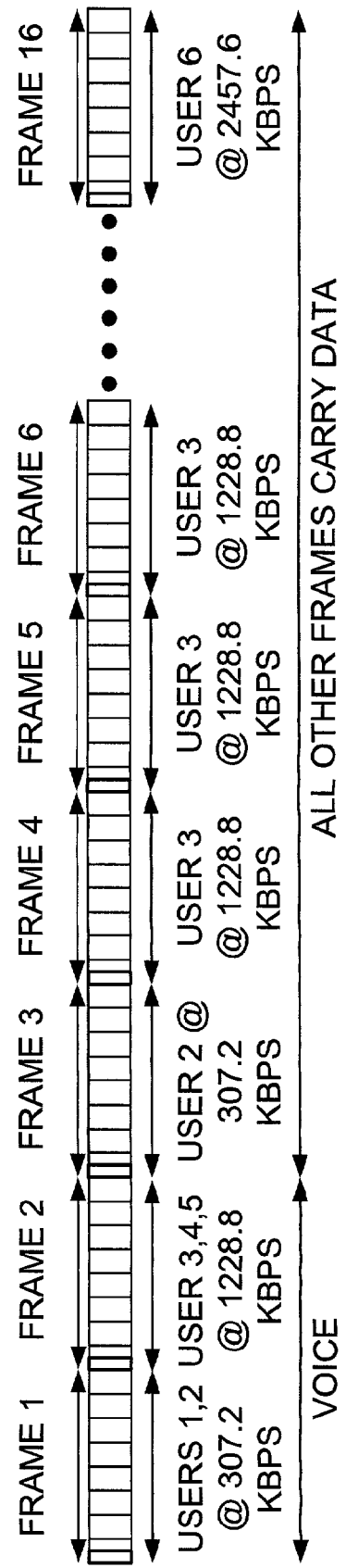

FIGS. 6A and 6B are block diagrams illustrating examples of superframes formed according to the present invention that carry both voice and data communications. Referring now particularly to FIG. 6A, at a first time T1, the superframe services a voice call for user 1 153.6 kbps, two voice calls for users 2 and 3 at 307.2 kbps and two voice calls for users 4 and 5 at 1228.8 kbps. The voice call of user 1 requires all of frame 1 to carry a 153.6 kbps voice call, whereas the voice calls of users 2 and 3 are each allocated one-half of frame 2. The voice calls of users 4 and 5 each require only an eighth of frame 3, respectively, with the remainder of the frame available to service data users at the same 1228.8 kbps data rate, e.g., data for users 4, 5 or 6.

The remaining frames are available to carry data at any of the allowed data rates. In the example of FIG. 6A users 2 and 3 receive data transmissions at the data rate of 307.2 kbps while users 4, 5, and 6 receive data transmissions at the data rate of 1228.8 kbps.

Referring now to FIG. 6B, at a succeeding time T2, the channel and interference conditions (C/I) have changed, and therefore some of the user terminals are serviced at different data rates. Thus, the still ongoing voice calls of users 1 and 2 are now transmitted at 307.2 kbps and are accommodated within frame 1, and the voice calls of users 3, 4, and 5 are now transmitted at 1228.8 kbps and occupy sub-frames of frame 2. The remaining bits within the frame 2 are allocated to one or more data users, e.g., any of users 3, 4, or 5 operating at 1228.8 kbps. However, it is possible that any user terminal could receive data at this rate if the channel conditions permitted.

The remaining frames are available carry data at any allowed data rate. In the example of FIG. 6A user 2 receives data transmissions at the data rate of 307.2 kbps while users 3, 4, and 5 receive data transmissions at the data rate of 1228.8 kbps. Finally, user 6 receives data transmissions at the data rate of 2457.6 kbps.

Figure 7:
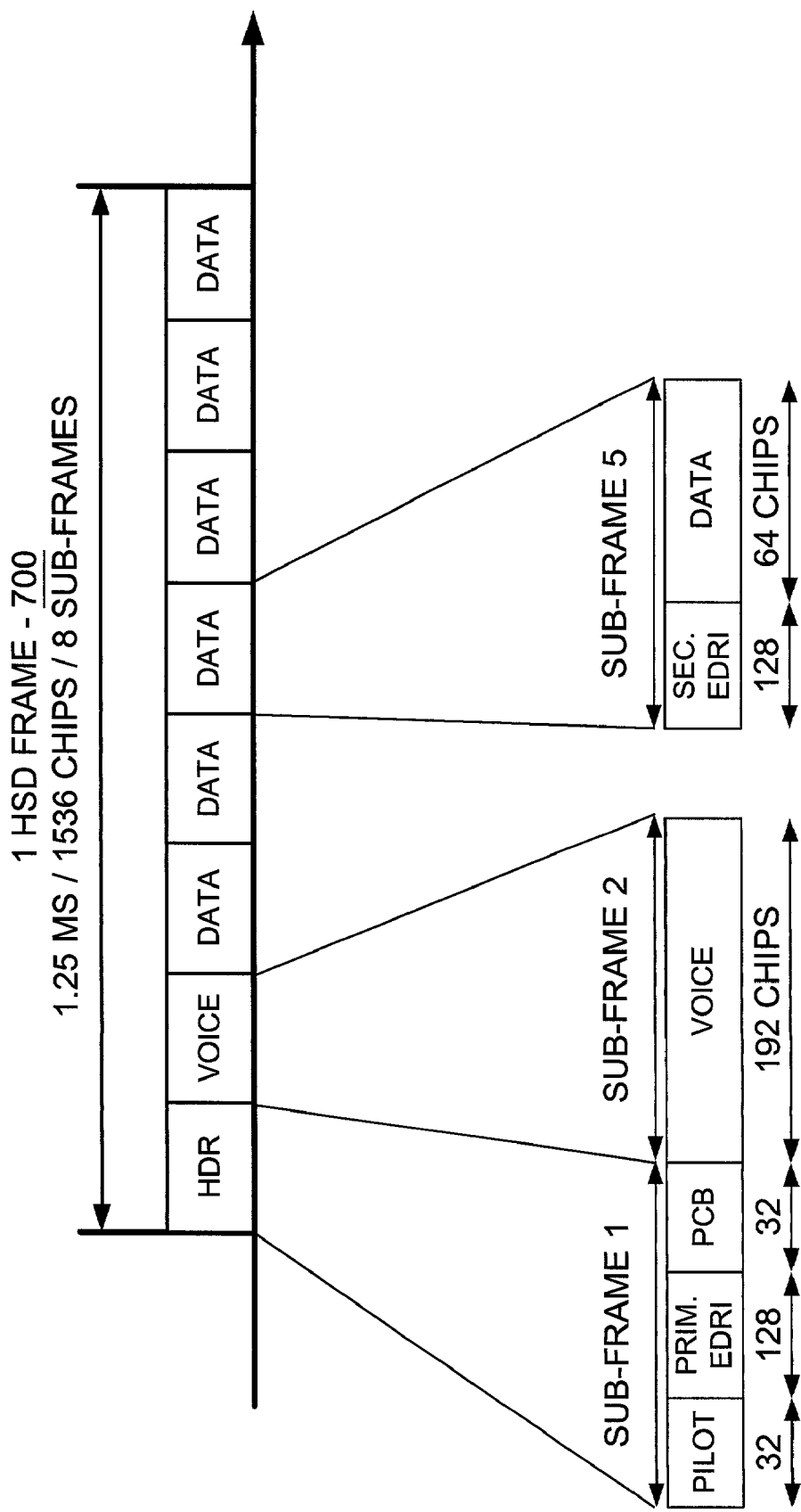
FIG. 7 is a block diagram illustrating the structure of a high speed data frame according to the present invention that carries both voice and data communications.

FIG. 7 is a block diagram illustrating the structure of a high speed data frame according to the present invention that carries both voice and data communications. Preferably, the voice sub-frames are clustered and are situated ahead of the data sub-frames. In the illustration of FIG. 7, the frame is a HSD frame having a duration of 1.25 ms and having 1536 chips and 8 sub-frames.

A preamble/header, e.g., the first subframe, is included within each frame to identify the user terminals and the corresponding data rates for each of the voice calls. As an example, sub-frame 1 is a header that includes a pilot signal, an explicit data rate indicator (EDRI) that identifies the user terminals, data rates, and frame locations for each voice call, and a power control bit field (PCB). A secondary EDRI field may also be included in another sub-frame, e.g., subframe 5. As is shown, sub-frame 2 carries a voice communication while the other sub-frames carry data communications. However, in some constructions of the HSD frame, all subframes may carry voice communications.

The structure and content of the preamble/header of the HSD frame has been discussed in detail with reference to FIG. 3. Substantial similarities exist between the structure described and the structure of FIG. 7. In particular, the pilot signal field and the PCB field are the same in the described embodiment. However, the EDRI field differs in that it indicates that at least one of the subframes of the frame carries a voice communication. If the HSD frame also carries data, the EDRI also indicates such.

Figure 8:
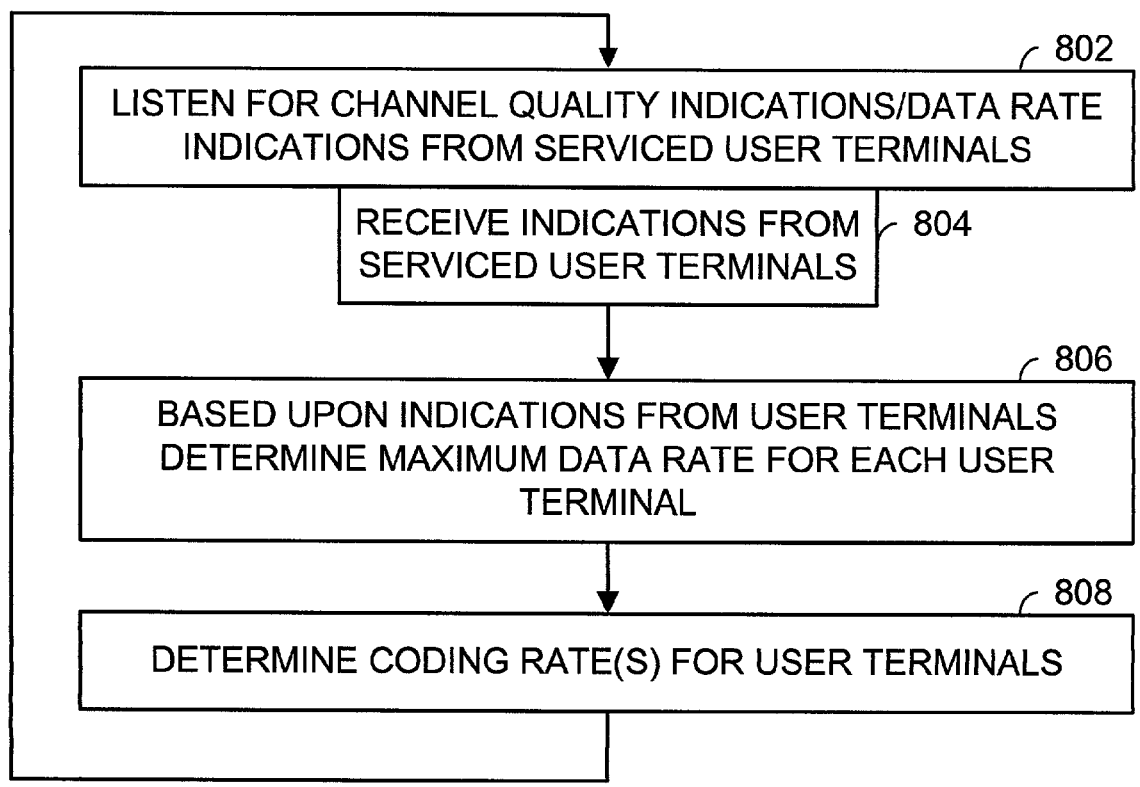
FIG. 8 is a logic diagram illustrating operation according to the present invention in determining forward link data rates and coding rates for a plurality of serviced user terminals.

FIG. 8 is a logic diagram illustrating operation according to the present invention in determining forward link data rates and coding rates for a plurality of serviced user terminals. The serviced user terminals may support voice communications and/or data communications. The principles described with reference to FIG. 8 apply to both of these communication types. Both the user terminals and the base station/infrastructure described with reference to FIG. 1 work together to perform the operations of FIG. 8.

The base station/infrastructure listens for channel quality indications/data rate indications from a plurality of serviced user terminals (step 802). As was described with reference to FIGS. 1 and 3, a plurality of user terminals serviced by a wireless network according to the present invention periodically receive pilot signals from one or more base stations on the F-CH within the described superframe/HSD frames. Based upon measured strengths of received pilot signals, measured interference, and thresholds stored internal to the user terminal, each user terminal periodically reports the C/I ratio(s) for at least one pilot signal to a base station servicing its reverse link. Alternately, based upon this determination of C/I ratio, the user terminal calculates a maximum data rate supportable upon the corresponding F-CH and reports this maximum data rate to the base station (step 804). The base station receives channel quality indications from most or all of its serviced user terminals. In one operation, channel quality indications are received every 1.25 ms.

With the channel quality indications received from the plurality of user terminals, the base station/network infrastructure determines a maximum data rate that may be supported for each reporting user terminal (step 806). Next, the base station/infrastructure determines the coding rate(s) that will be applied to forward link transmissions (step 808). According to the described embodiment of the present invention, turbo coding is employed to code data transmissions while convolutional coding is optionally employed to code voice transmissions. Finally, the next superframe, that includes a plurality of frames/subframes, is constructed (at step 810, according to the operations of FIG. 9). Once the superframe is constructed and transmitted on the F-CH, operation returns to step 802.

Figure 9:
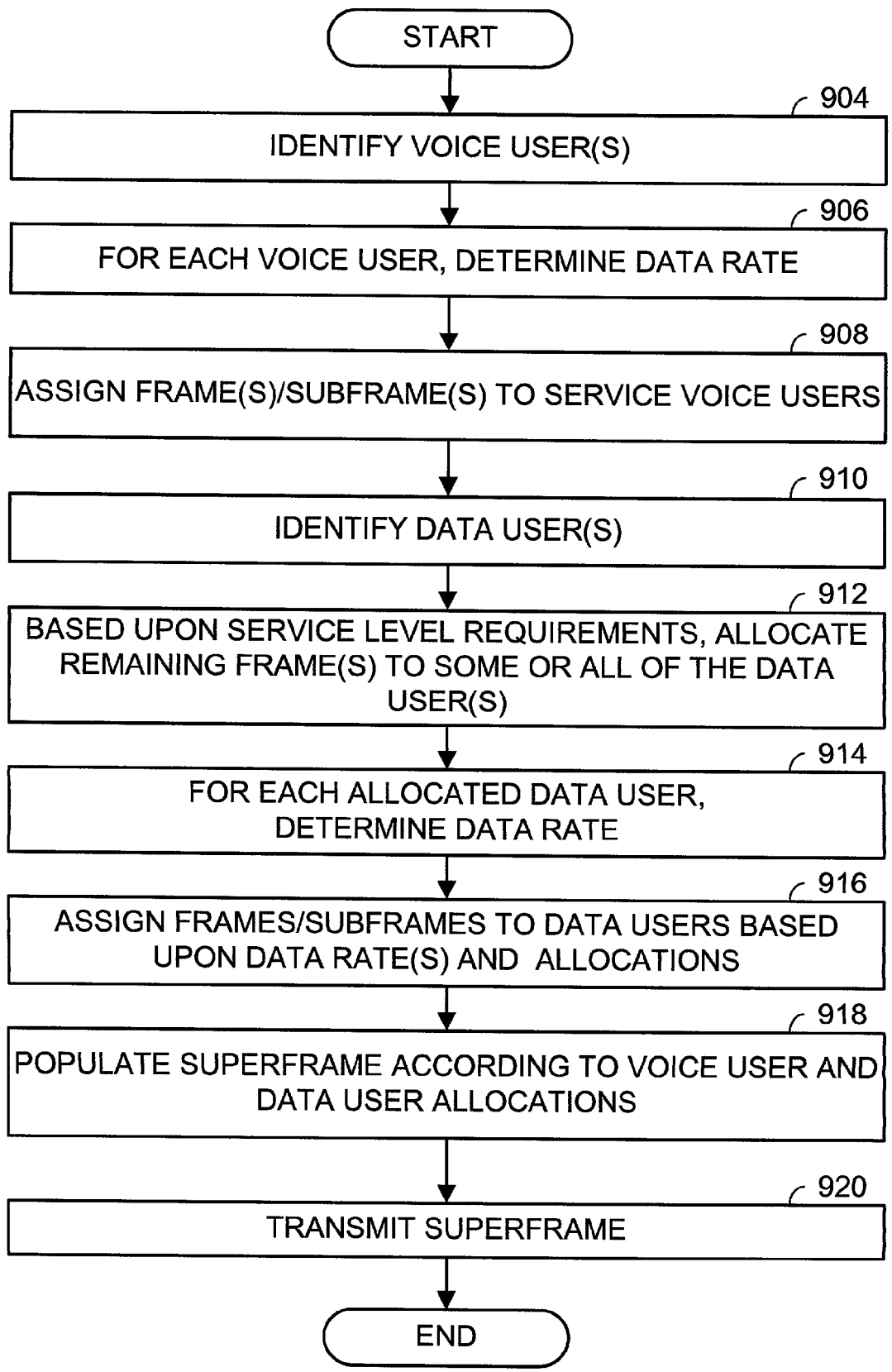
FIG. 9 is a logic diagram illustrating operation according to the present invention in constructing a superframe.

FIG. 9 is a logic diagram illustrating operation according to the present invention in constructing a superframe. The structure of the superframe is known. As was previously discussed, the superframe has a maximum duration to meet the requirements of the voice calls. Further, the superframe includes a plurality of frames, each of which includes a plurality of sub-frames. The frames and sub-frames have durations and framing structures appropriate to service the particular data rates, and data throughput requirements of the system.

Next, each voice user that is to be serviced by the superframe is identified (step 904). As was described with reference to FIG. 1, a single superframe services a plurality of voice user terminals 118, 120, and 122. Thus, voice communication information is included in the superframe for each of these user terminals. With each voice user identified, the data rate to be supported by each voice user is determined (step 906). The supported data rate also affects how the voice user transmissions are assigned in the superframe, e.g., user terminals may share frames. If two users share a frame, a data rate is chosen that is supported by the sharing user terminals. Frame/sub-frame assignments for the voice users are then made (step 908).

After the assignment of frames/sub-frames to voice users, allocations to variable rate data users are made. As a first step in making this allocation, the variable rate data users are identified (step 910). Then, based upon the service level requirements for each of the variable rate data users, e.g., QOS, IP SQL, etc., a determination is made as to which variable rate data users will be allocated frames/sub-frames in the current superframe. As was described with reference to FIG. 1, the F-CH is shared by a plurality of user terminals 106-116 that service data communications. Of these user terminals 106-116, a determination is made as to which, or all, of the user terminals 106-116 will be allocated frames/sub-frames in the superframe being constructed.

Once the variable rate data users have been identified and their service requirements have been determined, the remaining frames/sub-frames that were not used for the voice transmissions are allocated to the variable rate data users (step 912). Then, for each allocated variable rate data user, a corresponding supported data rate is determined (step 914). The available frames/sub-frames are then assigned to these variable rate data users based upon their respective data rates and the respective allocations (step 916). As was described with reference to FIGS. 6A and 6B, voice users and variable rate data users supporting the same data rates may share frames.

With the assignments of the voice users and the variable data rate users made, the superframe is populated with voice and variable rate data according to the assignments of steps 908 and 916 (step 918). Then, the superframe is transmitted on the F-CH to the users (step 920). The steps of FIG. 9 are then repeated for each subsequent superframe.

Figure 10:
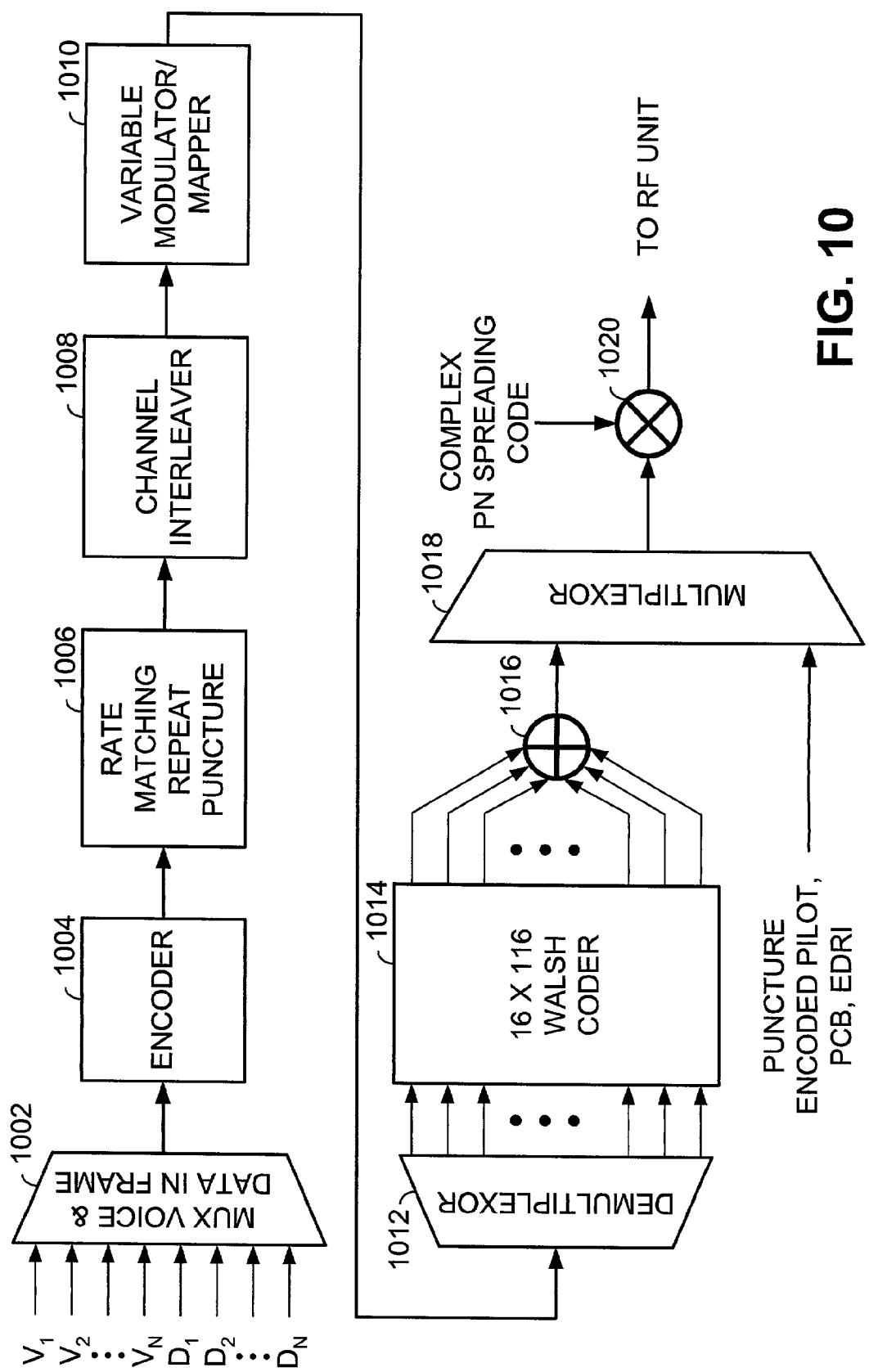
FIG. 10 is a block diagram showing an example of an apparatus for generating and processing the superframe structure of the invention.

FIG. 10 is a block diagram showing an example of an apparatus for generating and processing a superframe according to the present invention that includes both voice and data communications. The components illustrated in FIG. 10 would be included within a base station that constructs the superframe. While the elements of FIG. 10 (and FIGS. 11 and 12, as well) are shown as conventional circuit elements, some or all of the functions of these elements may be performed via software instructions by one or more digital processing devices, e.g., digital signal processor, micro processor, etc.

Voice communications and the voice communications are received by a multiplexor 1002. The multiplexor 1002 is controlled to provide one of the voice/voice communications to an encoder 1004 at any one time. As was described previously with FIGS. 2-7, a superframe includes voice and/or data communications intended for a plurality of user terminals serviced by the subject F-CH. Thus, all of these voice and/or data communications passes through the multiplexor 1002 to the encoder 1004. However, the order in which the multiplexor 1002 passes these voice and/or data communications to the encoder 1004 depends upon the assigned positions of the voice and/or data communications within a superframe under constructions. Operations performed in determining the structure of the superframe were described in detail with reference to FIGS. 8 and 9.

The encoder 1004 encodes the bit stream that it receives. In one embodiment, the encoder 1004 encodes all received voice and data communications using turbo-coding operations. However, other embodiments, other coding technique(s) are employed, e.g., convolutional coding of voice communications. A rate-matching operator 1006 receives the encoded bit stream from the encoder 1004 and performs repeating and/or puncturing operations to cause its output to be rate matched.

A channel interleaver 1008 receives the output of the rate-matching operator 1006 and interleaves the received input. The channel interleaver 1008 produces an interleaved output of its received input and provides the output to a variable modulator/mapper 1010. Depending upon the data rate of the particular frame/subframe of the superframe that is being produced, the variable modulator/mapper 1010 codes the bit stream according to a particular coding technique A demultiplexor 1012 receives the encoded output of the variable modulator/mapper 1010 and demulitiplexes the encoded output to produce 16 outputs. These 16 outputs are then coded with a 16×16 set of Walsh codes using Walsh coder 1014. Because the F-CH that carries the superframe is TDM so that at any time, the voice communication or voice communication carried by the F-CH is intended for only one user terminal. The user terminal then decodes one or more received communications using all 16 of the Walsh codes. Such decoding using all 16 Walsh codes produces a significantly improved decoded result as compared to coding using a single Walsh code or subset of the 16 Walsh codes.

The output of the Walsh coder 1014 is then summed at summing node 1016 and then multiplexed with the encoded pilot signal, EDRI, and PCBs at multiplexor 1018. The pilot signal, EDRI, and PCB, as have been previously described, are separately constructed and encoded. In the described embodiment, the pilot signal, EDRI, and the PCB are punctured into the bit stream produced at summing node 1016 via multiplexor 1018. Thus, some of the voice/data bits are lost. However, because of the robust nature of the encoding performed by the encoder 1004. This puncturing results in little or no degradation of performance.

The output of the multiplexor 1018 is then modulated with a complex PN spreading code at modulator 1020 to spread the energy of the communication across the allocated spectrum. The output of the modulator 1020 is then provided to an RF unit and transmitted on the F-CH at a designated carrier frequency.

Figure 11:
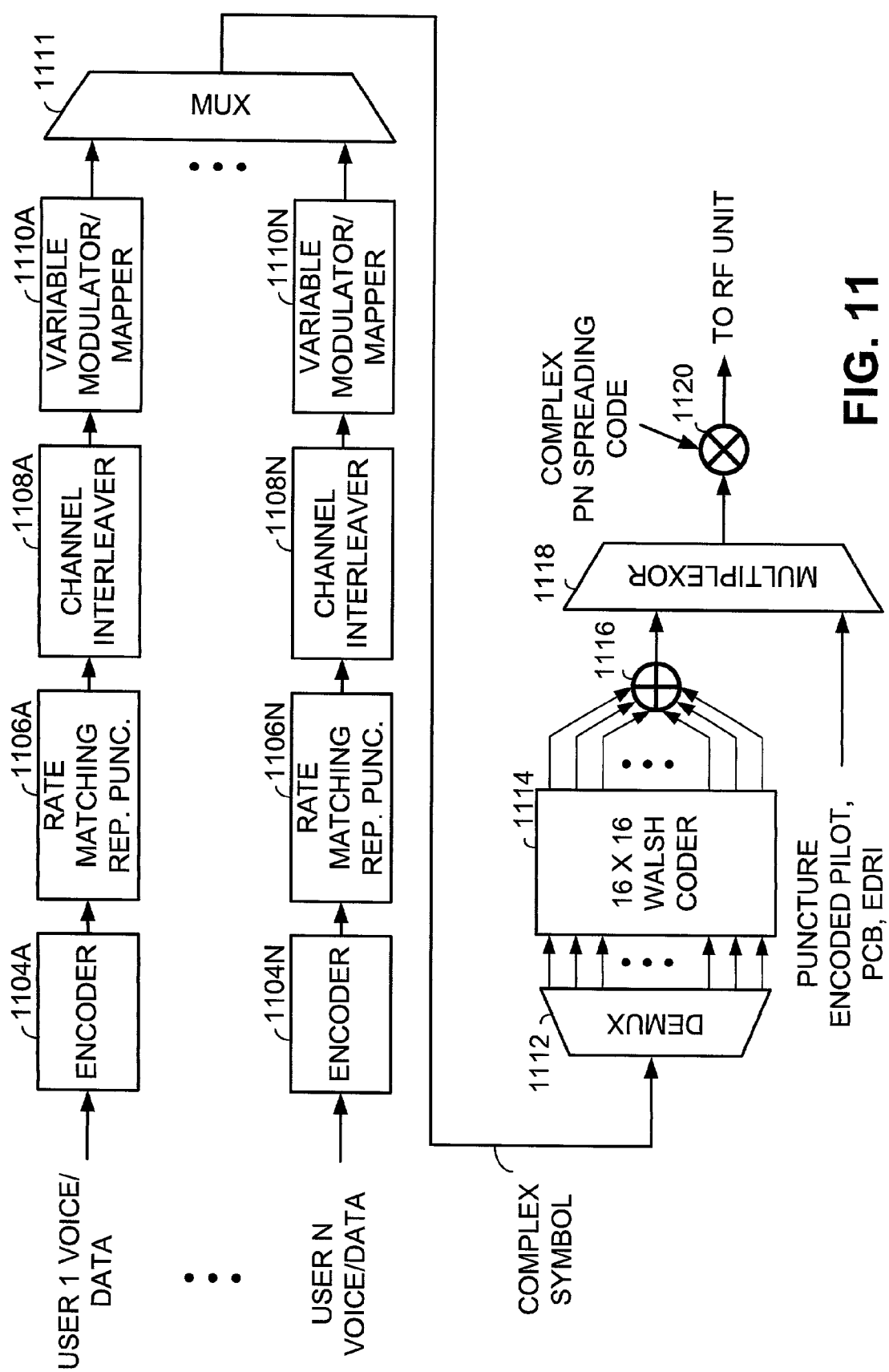
FIG. 11 is a block diagram showing another example of an apparatus for generating and processing the superframe structure of the invention in which each user data path may be partially separately processed.

FIG. 11 is a block diagram showing another example of an apparatus for generating and processing the superframe structure of the invention in which each user data path may be partially separately processed. The structure of the apparatus of FIG. 11 is similar to that described with particular reference to FIG. 10. However, with the structure of FIG. 11, each voice/data bit stream is provided to separate encoding, rate matching, channel interleaving, and modulation functions. In the example of FIG. 11, encoder 1104A receives user 1 voice/data and encodes the voice/data. The encoder 1104A uses an encoding technique appropriate for the voice/data being received from user 1. For example, if encoder 1104A receives voice, it uses convolutional coding to encode the received bits. However, if the encoder 1104A receives data, it uses turbo coding to encode the received bits. Likewise, the other encoders 1104B (not shown) through 1104N also use encoding techniques tailored to the voice/data received from user B through user N.

The outputs of the encoders 1104A through 1104N are then provided to rate matching operators 1106A through 1106N. These elements perform repeating and/or puncturing operations to cause their outputs to be rate matched. Channel interleavers 1108A through 1108N receive the outputs of the rate matching operators 1106A through 1106N, respectively and interleave the received inputs. The channel interleavers 1108A through 1108N produce interleaved outputs that are provided to variable modulators/mappers 1110A through 1110N, respectively. Depending upon the respective data rates of the outputs to be produced, the variable modulators/mappers 1110A through 1110N code the bit streams according to the particular coding techniques.

The outputs of the variable modulators/mappers 1110A through 1110N are then multiplexed by multiplexor 1112 to produce complex symbols. These complex symbols are then demultiplexed via demultiplexor 1112, coded using a 16×16 Walsh coder 1114 and summed at summing node 1116. The output of the summing node 1116 is then multiplexed by multiplexor 1118 with the encoded pilot signal, the EDRI, and the PCBs. The output of the multiplexor is then modulated with a complex PN spreading code at modulator 1120 and sent to the RF unit.

Figure 12:
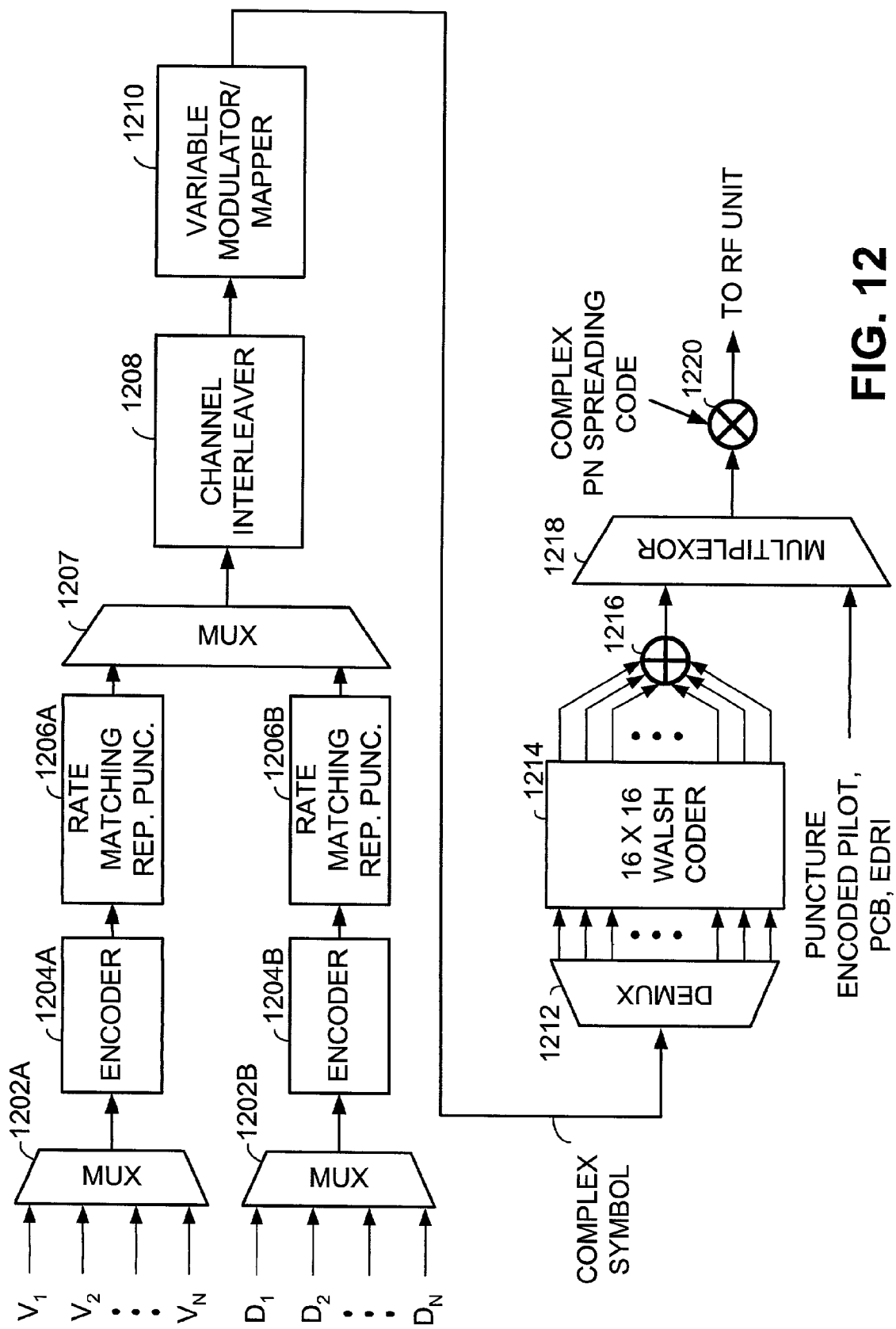
FIG. 12 is a block diagram showing an example of an apparatus for generating and processing the superframe structure of the invention in which voice and data communications are partially separately processed.

FIG. 12 is a block diagram showing an example of an apparatus for generating and processing the superframe structure of the invention in which voice and data communications are partially separately processed. The structure of the apparatus of FIG. 12 is similar to that described with particular reference to FIGS. 10 and 11. However, with the structure of FIG. 12, the voice and data communications are separately encoded and rate matched prior to being combined.

In the example of FIG. 12, multiplexor 1202A receives and multiplexes a plurality of voice user bits while multiplexor 1202B receives and multiplexes a plurality of data user bits. Encoder 1204A receives the multiplexed voice communication and uses an appropriate encoding technique to encode the voice communications, e.g., convolutional coding. A rate matching operator 1206A receives the output of encoder 1204A and performs repeating and/or puncturing operations to cause produce an output that is rate matched.

Likewise, encoder 1204B receives the multiplexed voice communication and uses an appropriate encoding technique to encode the voice communications, e.g., turbo coding. A rate matching operator 1206B receives the output of encoder 1204A and performs repeating and/or puncturing operations to cause produce an output that is rate matched. A multiplexor 1207 then multiplexes the encoded and rate matched voice and voice communications.

Channel interleaver 1208 receives the output of the multiplexor 1207 and interleaves the received communication. The channel interleaver 1208 produces an interleaved output and provides the interleaved output to a variable modulator/mapper 1210 that modulates the communication. Depending upon the data rate to be produced, the variable modulator/mapper 1210 codes the bit stream according to the particular coding techniques.

The output of the variable modulator/mapper 1210 is then demultiplexed via demultiplexor 1212, coded using a 16×16 Walsh coder 1214 and summed at summing node 1216. The output of the summing node 1216 is then multiplexed by multiplexor 1218 with the encoded pilot signal, the EDRI, and the PCBs. The output of the multiplexor is then modulated with a complex PN spreading code at modulator 1220 and sent to the RF unit.

Figure 13:
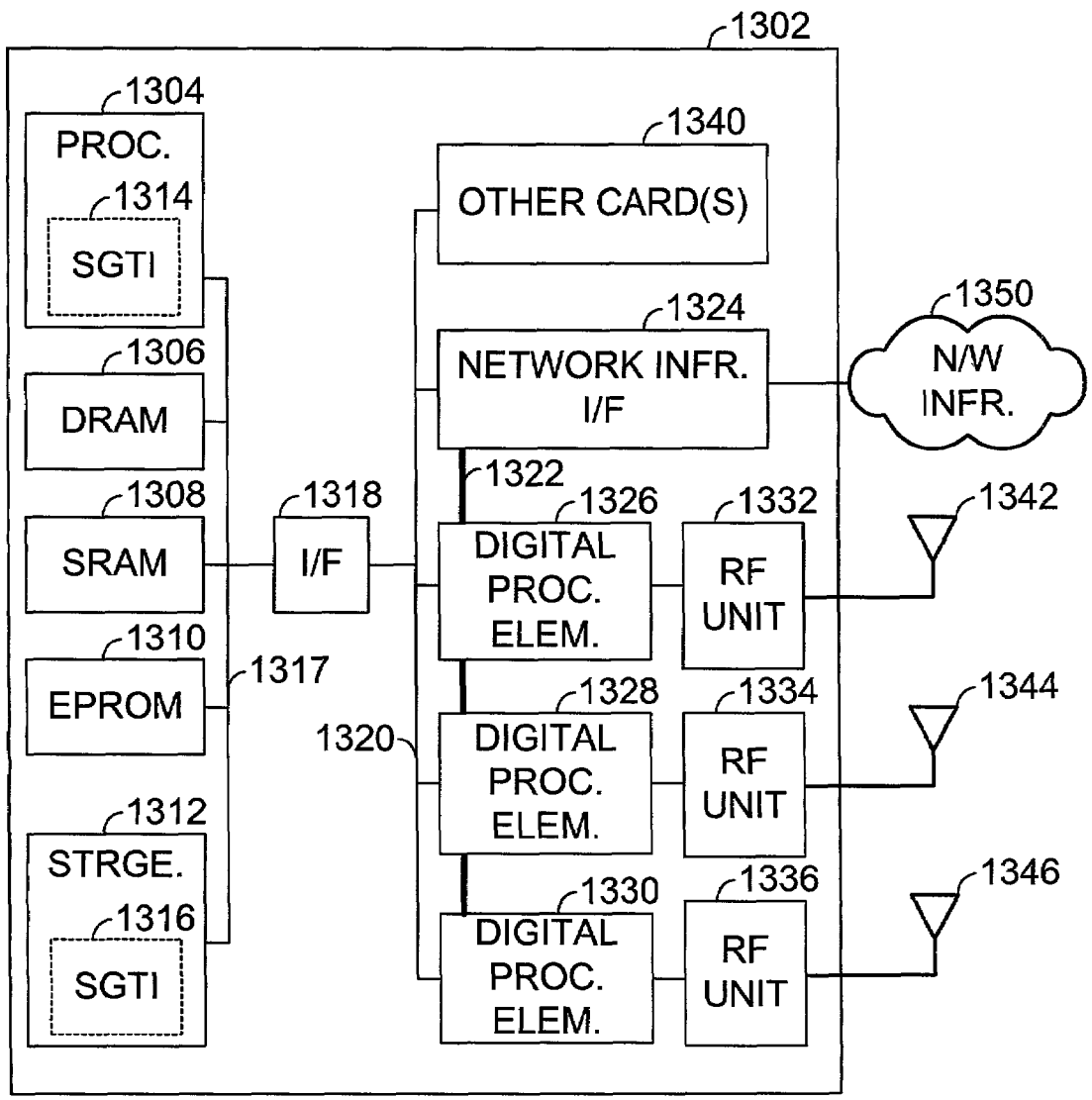
FIG. 13 is a block diagram illustrating a base station constructed according to the present invention.

FIG. 13 is a block diagram illustrating a base station 1302 constructed according to the present invention that performs the operations previously described herein. The base station 1302 supports a CDMA operating protocol, e.g., IS-95A, IS-95B, IS-2000, and/or various 3G and 4G standards, that is, or has been modified to be compatible with the teachings of the present invention. However, in other embodiments, the base station 1302 supports other operating standards.

The base station 1302 includes a processor 1304, dynamic RAM 1306, static RAM 1308, flash memory/EPROM 1310 and at least one data storage device 1312, such as a hard drive, optical drive, tape drive, etc. These components (which may be contained on a peripheral processing card or module) intercouple via a local bus 1317 and couple to a peripheral bus 1320 (which may be a back plane) via an interface 1318. Various peripheral cards couple to the peripheral bus 1320. These peripheral cards include a network infrastructure interface card 1324, which couples the base station 1302 to the wireless network infrastructure 1350. Digital processing cards 1326, 1328, and 1330 couple to Radio Frequency (RF) units 1332, 1334, and 1336, respectively. The RF units 1332, 1334, and 1336 couple to antennas 1342, 1344, and 1346, respectively, and support wireless communication between the base station 1302 and user terminals (shown in FIG. 14). The base station 1302 may include other cards 1340 as well.

Superframe Generation and Transmission Instructions (SGTI) 1316 are stored in storage 1312. The SGTI 1316 are downloaded to the processor 1304 and/or the DRAM 1306 as SGTI 1314 for execution by the processor 1304. While the SGTI 1316 are shown to reside within storage 1312 contained in base station 1302, the SGTI 1316 may be loaded onto portable media such as magnetic media, optical media, or electronic media. Further, the SGTI 1316 may be electronically transmitted from one computer to another across a data communication path. These embodiments of the SGTI are all within the spirit and scope of the present invention. Upon execution of the SGTI 1314, the base station 1302 performs operations according to the present invention previously described herein in generating and transmitting superframes according to the description of FIGS. 1-12.

The SGTI 1316 may also be partially executed by the digital processing cards 1326, 1328, and 1330 and/or other components of the base station 1302. Further, the structure of the base station 1302 illustrated is only one of many varied base station structures that could be operated according to the teachings of the present invention.

Figure 14:
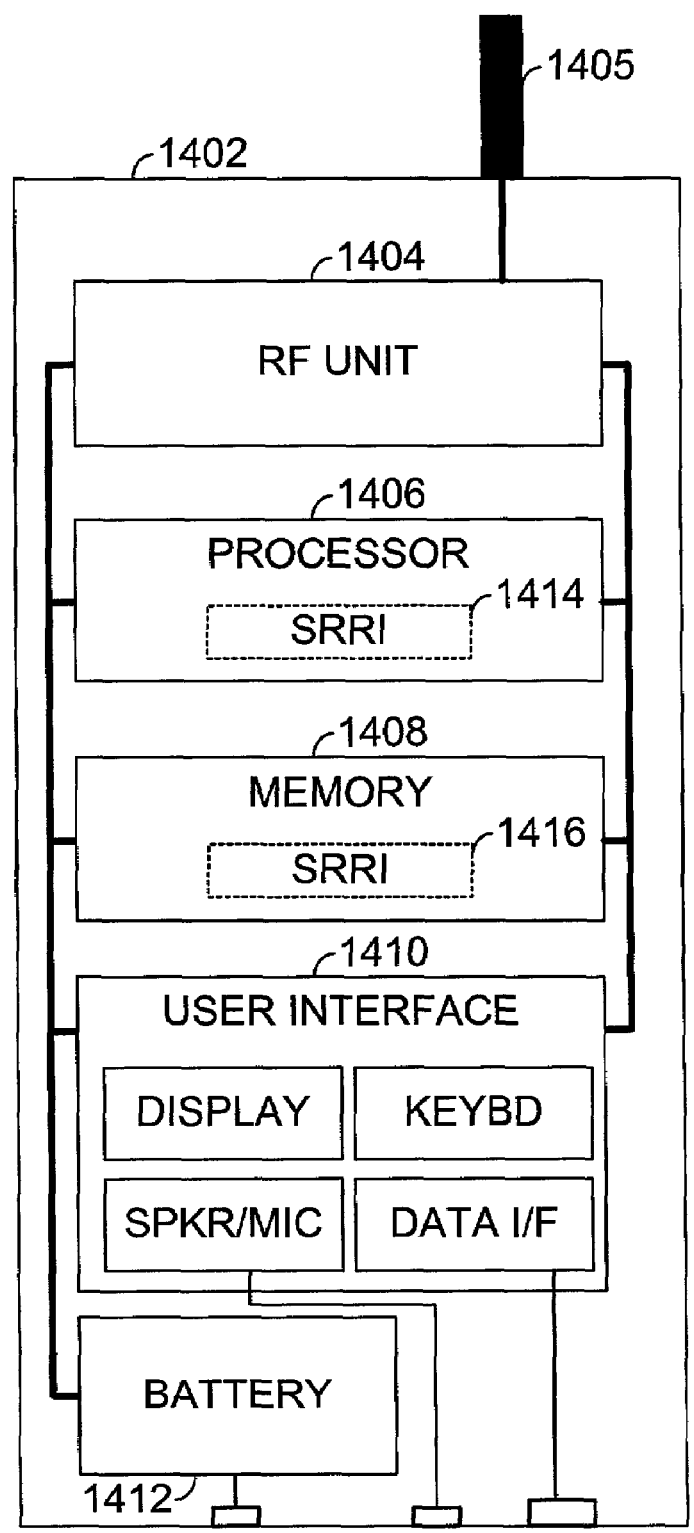
FIG. 14 is a block diagram illustrating a user terminal constructed according to the present invention.

FIG. 14 is a block diagram illustrating a user terminal 1402 constructed according to the present invention that performs the operations previously described herein. The user terminal 1402 supports a CDMA operating protocol, e.g., IS-95A, IS-95B, IS-2000, and/or various 3G and 4G standards that is, or has been modified to be compatible with the teachings of the present invention. However, in other embodiments, the user terminal 1402 supports other operating standards.

The user terminal 1402 includes an RF unit 1404, a processor 1406, and a memory 1408. The RF unit 1404 couples to an antenna 1405 that may be located internal or external to the case of the user terminal 1402. The processor 1406 may be an Application Specific Integrated Circuit (ASIC) or another type of processor that is capable of operating the user terminal 1402 according to the present invention. The memory 1408 includes both static and dynamic components, e.g., DRAM, SRAM, ROM, EEPROM, etc. In some embodiments, the memory 1408 may be partially or fully contained upon an ASIC that also includes the processor 1406. A user interface 1410 includes a display, a keyboard, a speaker, a microphone, and a data interface, and may include other user interface components. The RF unit 1404, the processor 1406, the memory 1408, and the user interface 1410 couple via one or more communication buses/links. A battery 1412 also couples to and powers the RF unit 1404, the processor 1406, the memory 1408, and the user interface 1410.

Superframe Receipt and Response Instructions (SRRI) 1416 are stored in memory 1408. The SRRI 1416 are downloaded to the processor 1406 as SRRI 1414 for execution by the processor 1406. The SRRI 1416 may also be partially executed by the RF unit 1404 in some embodiments. The SRRI 1416 may be programmed into the user terminal 1402 at the time of manufacture, during a service provisioning operation, such as an over-the-air service provisioning operation, or during a parameter updating operation. The structure of the user terminal 1402 illustrated is only an example of one user terminal structure. Many other varied user terminal structures could be operated according to the teachings of the present invention.

Upon execution of the SRRI 1414, the user terminal 1402 performs operations according to the present invention previously described herein in receiving a superframe construction according to the present invention. These operations include decoding portions of the superframe intended for the user terminal 1402 and responding to a servicing base station, e.g., base station 1302, to indicate channel quality. Operations performed by the user terminal 1402 in receiving the superframe and extracting intended information are generally known. Additional required operations of receiving and interpreting the primary EDRI and the secondary EDRI are evident based upon the teachings provided herein. Further, other of these operations are executed to report channel quality indications or maximum supportable data rate indications to a base station 1302 that services a corresponding reverse link.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

The invention claimed is:

1. A method for operating a base station to wirelessly transmit data communications to a plurality of user terminals on a single wireless carrier, the method comprising:
   repeatedly and sequentially wirelessly transmitting time divison multiplexed superframes to the plurality of user terminals, wherein each time divison multiplexed superframe comprises a plurality of high speed data frames;
   wherein each of the high speed data frames carries at least one data communication; and
   wherein each of the high speed data frames includes at least one explicit data rate indicator that identifies:
      at least one user terminal of the plurality of user terminals for which at least one respective data communication carried by the high speed data frame is intended;
      at least one data rate of the at least one respective data communication carried by the high speed data frame; and
      at least one relative position of the at least one data communication carried by the high speed data frame.

2. The method of claim 1, further comprising supporting a plurality of data rates within the high speed data frames of a single superframe.

3. The method of claim 1, further comprising supporting a plurality of coding rates and modulation schemes within the high speed data frames of a single superframe.

4. The method of claim 1, further comprising coding the superframes with a plurality of Walsh codes prior to transmission.

5. The method of claim 1, further comprising:
   coding the data communications of a high speed data frame using a first coding type; and
   coding the respective indicator of the high speed data frame using a second coding type that is different from the first coding type.

6. The method of claim 1, wherein each of the high speed data frames further includes:
   a pilot signal; and
   a plurality of reverse link power control bits intended for the plurality of user terminals.

7. The method of claim 1, wherein:
   the at least one explicit data rate indicator includes both a primary explicit data rate indicator and a secondary explicit data rate indicator;
   wherein the primary explicit data rate indicator indicates: a user terminal of the plurality of user terminals for which a first portion of the high speed data frame is intended; and a data rate for the first portion of the high speed data frame; and
   wherein the secondary explicit data rate indicator indicates a user terminal of the plurality of user terminals for which a second portion of the high speed data frame is intended.

8. A superframe formed within a transmitting wireless device for carrying data communications intended for a plurality of user terminals, the superframe comprising:
   a plurality of high speed data frames;

wherein each of the high speed data frames carries at least one data communication; and wherein each of the high speed data frames includes at least one explicit data rate indicator that identifies:
- at least one user terminal of the plurality of user terminals for which at least one respective data communication carried by the high speed data frame is intended;
- atleast one data rate of the at least one respective data communication carried by the high speed data frame; and
- at least one relative position of the at least one data communication carried by the high speed data frame.

9. The superframe of claim 8, wherein each superframe supports a plurality of data rates.

10. The superframe of claim 8, wherein each superframe supports a plurality of coding rates and modulation schemes.

11. The superframe of claim 8, wherein the superframe is coded with a plurality of Walsh codes prior to its transmission.

12. The superframe of claim 8, wherein:
- the data communications of a high speed data frame are coded using a first coding type; and
- the respective indicator of the high speed data frame are coded using a second coding type that is different than the first coding type.

13. The superframe of claim 8, wherein each of the high speed data frames of the superframe further includes:
- a pilot signal; and
- a plurality of reverse link power control bits intended for the plurality of user terminals.

14. The superframe of claim 8, wherein:
- the at least one explicit data rate indicator of the superframe includes both a primary explicit data rate indicator and a secondary explicit data rate indicator;
- wherein the primary explicit data rate indicator indicates: a user terminal of the plurality of user terminals for which a first portion of the high speed data frame is intended; and a data rate for the first portion of the high speed data frame; and
- wherein the secondary explicit data rate indicator indicates a user terminal of the plurality of user terminals for which a second portion of the high speed data frame is intended.

15. A method of operating a user terminal to wirelessly receive data communications on a wireless carrier, the method comprising:
- repeatedly and sequentially wirelessly receiving time division multiplexed superframes from a base station, wherein each time division multiplexed superframe comprises a plurality of high speed data frames that are intended for a plurality of user terminals;
- for each of the plurality of high speed data frames, receiving a respective indication of its contents;
- for each of the plurality of high speed data frames, receiving at least one explicit data rate indicator that identifies:
  - at least one user terminal of the plurality of user terminals for which at least one respective data communication carried by the high speed data frame is intended;
  - atleast one data rate of the at least one respective data communication carried by the high speed data frame; and
  - at least one relative position of the at least one data communication carried by the high speed data frame;
- determining that a particular high speed data frame of the superframe is intended for the user terminal based upon the respective indication;
- determining a data rate of the particular high speed data frame based upon the respective indication; and
- receiving a data communication contained in the particular high speed data frame.

16. The method of claim 15, further comprising decoding at least a portion of the superframe with a plurality of Walsh codes.

17. The method of claim 15, further comprising:
- decoding the respective indication contained in a high speed data frame using a first coding type;
- determining that the high speed data frame of the superframe is intended for the user terminal after the decoding;
- receiving a data communication contained in the high speed data frame; and
- decoding the data communications of the high speed data frame using a second coding type that is different from the first coding type.

18. The method of claim 15, further comprising:
- receiving a pilot signal contained in the high speed data frame; and
- receiving a reverse link power control bit contained in the high speed data frame.

19. The method of claim 18, further comprising:
- determining a channel quality indicator based upon the received pilot signal; and
- reporting the channel quality indicator to a the base station.

20. A base station that acts as a transmitter to wirelessly transmit data communications to a plurality of user terminals on a single wireless carrier, the base station comprising:
- an antenna;
- a Radio Frequency unit coupled to the antenna; and
- at least one digital processor coupled to the Radio Frequency unit that executes software instructions causing the base station to:
  - repeatedly and sequentially wirelessly transmit time division multiplexed superframes to the plurality of user terminals, wherein each time division multiplexed superframe comprises a plurality of high speed data frames;
  - wherein each of the high speed data frames carries at least one data communication; and
  - wherein each of the high speed data frames includes at least one explicit data rate indicator that identifies:
    - at least one user terminal of the plurality of user terminals for which at least one respective data communication carried by the high speed data frame is intended;
    - atleast one data rate of the at least one respective data communication carried by the high speed data frame; and
    - at least one relative position of the at least one data communication carried by the high speed data frame;

21. A user terminal that acts as a wireless receiver to wirelessly receive data communications on a wireless carrier, the user terminal comprising:
- an antenna;
- A Radio Frequency unit coupled to the antenna; and
- a digital processor coupled to the Radio Frequency unit that executes software instructions causing the user terminal to:
  - repeatedly and sequentially wirelessly receive time division mulitiplexed superframes from a base station, wherein each time division multiplexed superframe comprises a plurality of high speed data frames that are intended for a plurality of user terminals; p1 for each of the plurality of high speed data frames, receiving a respective indication of its contents includes at least one explicit data rate indicator that identifies:
- at least one user terminal of the plurality of user terminals for which at least one respective data communication carried by the high speed data frame is intended;
- atleast one data rate of the at least one respective data communication carried by the high speed data frame; and
- at least one relative position of the at least one data communication carried by the high speed data frame;
- for each of the plurality of high speed data frames, determine whether the high speed data frame is intended for the user terminal;
- determining that a particular high speed data frame of the superframe is intended for the user terminal; and
- receive a data communication contained in the particular high speed data frame.

22. A plurality of software instructions stored on a computer readable medium that, upon execution by a computer processor a base station, cause the base station to wirelessly transmit data communications to a plurality of user terminals on a single wireless carrier, the plurality of software instructions comprising:
- a set of instructions executed by the base station that cause the base station to repeatedly and sequentially wirelessly transmit time division multiplexed superframes to the plurality of user terminals, wherein each time division multiplexed superframe comprises a plurality of high speed data frames;
- wherein each of the high speed data frames carries at least one data communication; and
- wherein each of the high speed data frames includes at least one explicit data rate indicator that identifies:
  - at least one user terminal of the plurality of user terminals for which at least one respective data communication carried by the high speed data frame is intended;
  - atleast one data rate of the at least one respective data communication carried by the high speed data frame; and
  - at least one relative position of the at least one data communication carried by the high speed data frame.

23. A plurality of software instructions stored on a computer readable medium that, upon execution by a computer processor a user terminal, cause the user terminal to wirelessly data communications on a wireless carrier, the plurality of software instructions comprising:
- a set of instructions executed by the user terminal that cause the user terminal to repeatedly and sequentially wirelessly receive time division multiplexed superframes from a base station, wherein each time division multiplexed superframe comprises a plurality of high speed data frames that are intended for a plurality of user terminals;
- a set of instructions executed by the user terminal that cause the user terminal, for each of the plurality of high speed data frames, receive a respective indication of its contents;
- a set of instructions executed by the user terminal that cause the user terminal, for each of the plurality of high speed data frames, receive a respective indication of its contents that includes:
  - a respective indication of a user terminal for which the high speed data frame is intended; and
- a set of instructions executed by the user terminal that cause the user terminal to determine that a particular high speed data frame of the superframe is intended for the user terminal;
- a set of instructions executed by the user terminal that cause the user terminal to determine a data rate of the particular high speed data frame of the superframe based upon the respective indication; and
- a set of instructions executed by the user terminal that cause the user terminal receive a data communication contained in the particular high speed data frame.

* * * * *

UNITED STATES PATENT AND TRADEMARK OFFICE
CERTIFICATE OF CORRECTION

PATENT NO. : 7,463,600 B2 Page 1 of 1
APPLICATION NO. : 09/766267
DATED : December 9, 2008
INVENTOR(S) : Wen Tong et al.

It is certified that error appears in the above-identified patent and that said Letters Patent is hereby corrected as shown below:

Column 17, line 9, in Claim 8: replace "atleast" with --at least--.

Column 17, line 63, in Claim 15: replace "atleast" with --at least--.

Column 18, line 52, in Claim 20: replace "atleast" with --at least--.

Column 18, line 61, in Claim 21: "A" should be lowercase.

Column 19, line 2, in Claim 21: remove "p1".

Column 19, line 10, in Claim 21: replace "atleast" with --at least--.

Column 20, line 1, in Claim 22: replace "atleast" with --at least--.

Column 20, lines 18-21, in Claim 23: delete "a set of instructions executed by the user terminal that cause the user terminal, for each of the plurality of high speed data frames, receive a respective indication of its contents;".

Column 20, line 28, in Claim 23: insert --a respective indication of a data rate of the high speed frame;--.

Signed and Sealed this

Nineteenth Day of May, 2009

JOHN DOLL
*Acting Director of the United States Patent and Trademark Office*